July 29, 1952
J. COLIN ET AL
2,604,988
FROTH FLOTATION OF POTASSIUM CHLORIDE FROM SODIUM CHLORIDE
Filed June 17, 1947
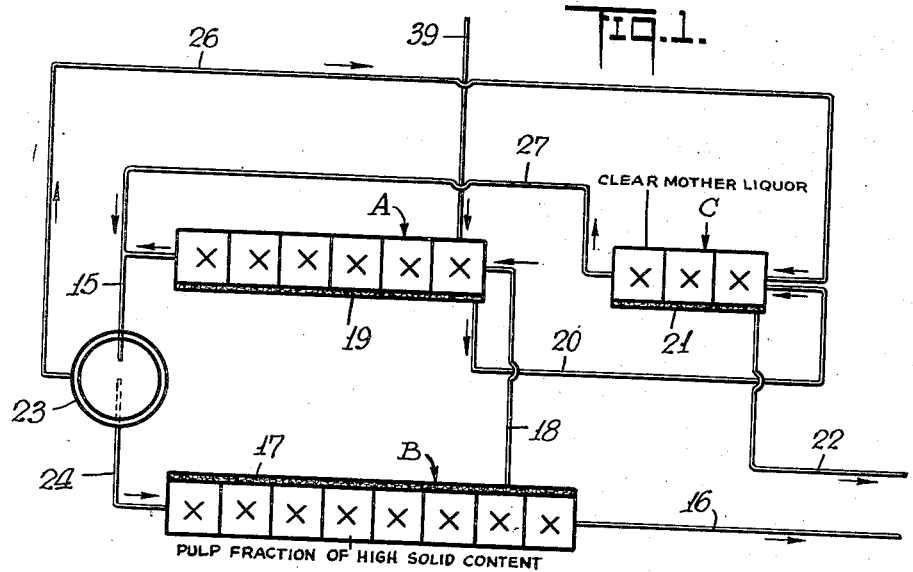
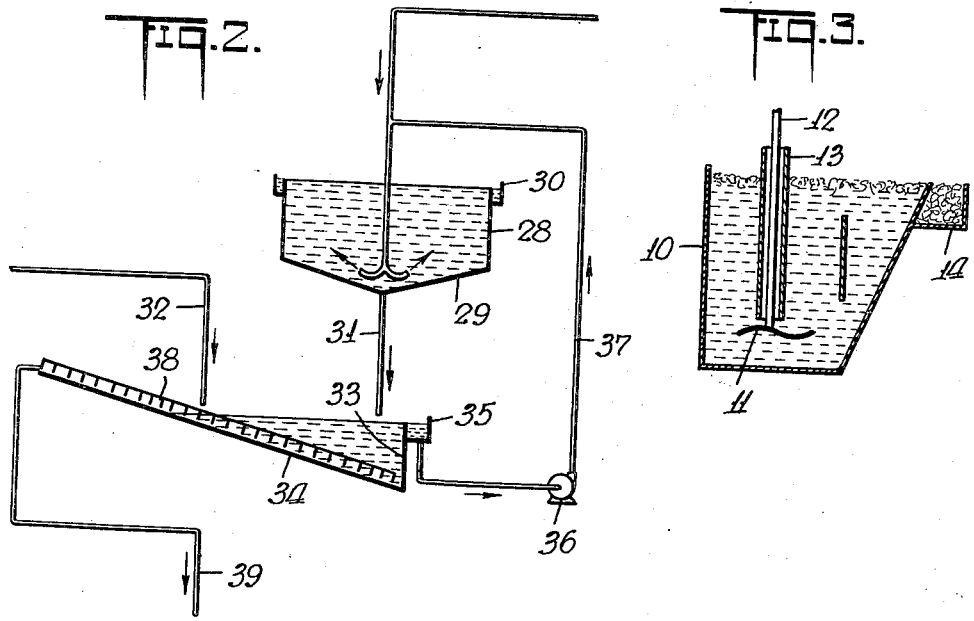
INVENTOR
JULES COLIN
RICHARD BURR
ROGER FRIEDRICH
XAVIER HERRGOTT
BY
Dean Fairbank & Hirsch
ATTORNEYS Patented July 29, 1952

2,604,988

UNITED STATES PATENT OFFICE 2,604,988

FROTH FLOTATION OF POTASSIUM CHLORIDE FROM SODIUM CHLORIDE

Jules Colin, Richard Burr, Roger Friedrich, and Xavier Herrgott, Mulhouse, Haut-Rhin, France, assignors to Mines Domaniales de Potasse d'Alsace, Mulhouse, Haut-Rhin, France, a corporation of France Application June 17, 1947, Serial No. 755,188
In France July 16, 1946

9 Claims. (Cl. 209—166)

The present invention relates to mineral separation by flotation, and while the illustrative example hereinafter described shows an important application of the invention to the separation of potassium chloride in the flotation treatment of sylvinite ore, the invention has utility for the extraction of other ores.

As conducive to a clear understanding of the invention, it is noted that where the pulp from which a valuable component is to be removed by the froth formed in the flotation process has relatively low solid content, a rich froth is formed, but the efficiency of extraction is relatively low and much of the solid to be extracted remains in the pulp. On the other hand where the pulp has relatively high solid content, while extraction may be nearly complete, the froth is not sufficiently selective and it takes up considerable proportions of solids intended to be rejected.

It is among the objects of the invention to provide a procedure and equipment capable of continuous operation which shall obviate the limitations of flotation in pulp of medium solid content, and which shall utilize the specific advantages and obviate the specific disadvantages of pulp of relatively low solid content on the one hand and relatively high solid content on the other, in order greatly to increase the rate and completeness of extraction and to do so with a minimum of waste of flotation reagent.

According to the invention from one of its aspects the extraction process is conducted in three stages, involving three interconnected sets of flotation cells. The first stage utilizes a pulp of medium solid content from which the tailing is separated into a fraction of relatively high solid content and a clear liquor, the former of which is utilized as pulp in the second stage and the latter is used in the third stage. The froth from the second stage is returned to the first stage, from which the froth is in turn passed to the third stage and the selected component to be extracted from the ore is removed from the froth in the latter stage.

According to a feature of the invention, a single settling tank or decanter supplied from the tailing of the first and third stages serves for gravity separation into two fractions, a heavier or more concentrated thickened pulp and a lighter supernatant liquor, the former being delivered to the second stage and the latter to the third stage for use as pulp in the flotation cells of the respective stages.

In carrying out the process, suitable flotation reagent would be employed which would be mixed with a suitable frothing agent and there is also preferably included a suitable modifying agent which latter performs a selective action to prevent adsorption or absorption of valuable flotation reagent by the dross and to prevent flotation of such dross.

Were the ore slurry derived from the grinding mill, fed directly into the flotation cells, there would be included excessive quantities of dross which would absorb considerable amounts of the relatively costly flotation reagent and render the process relatively uneconomical, especially so where friable, clayey schist is present.

According to another feature of the invention, the ore slurry is permitted to settle so that the lighter mud may be decanted and the residue is then washed, desirably in a tank having an inclined bottom, the mud being decanted and the relatively clear residue being moved by a suitable conveyor for entry into the first flotation stage for operation in the manner above referred to.

In the application of the three stage flotation extraction process to sylvinite ore, substantially pure potassium chloride would appear in the froth from the third stage, while the pulp containing largely sodium chloride and substantially completely freed of potassium chloride would be taken from the second stage.

Before flotation such sylvinite ore would be ground down to particles of 1 mm. or less in a liquid medium, in which grinding an important part of the clay schists of such sylvinite ore would go into suspension. The calcium and other heavy metal salts contained in the schists of the muds thus formed tend to react with the flotation reagent to produce insoluble products. By reason of the very large surface that these excessively fine particles of clay present, the muds absorb a very appreciable quantity of the flotation reagent, which constitutes a substantial waste of valuable material.

The invention has as a specific object to eliminate the objectionable effect of such heavy metals or of elements rich in such heavy metals in the flotation treatment of sylvinite ore. That object is attained according to the present invention by eliminating by simple separation, for example by decantation, much of the dross which is in the form of fine particles in the clays; and the action of the heavy metals in the dross not removed by decantation is overcome by the introduction of a modifying agent into the flotation cells, which largely prevents the flotation reagent from being adsorbed or absorbed by such metal components of the dross.

It is another object of the invention to preclude the formation of minute crystals of the salts to be extracted in the saturated solution that constitutes the mother liquor in the extraction from sylvinite or similar ore, since such crystals would adsorb or absorb much of the flotation reagent with consequent waste.

The formation of such minute salt crystals is prevented by keeping the salt-saturated mother liquor from cooling to such extent as to permit crystallization.

In the accompanying drawings in which is shown one of various possible embodiments of the several features of the invention, Fig. 1 is a diagrammatic plan view of the equipment, Fig. 2 is a diagrammatic elevation of the equipment for preliminary treatment prior to flotation, and Fig. 3 is a diagrammatic sectional view of a conventional flotation cell used in the system.

Referring now to the drawings, the system includes preferably three flotation stages A, B and C, each of which comprises a battery of flotation cells. Each cell may be of the conventional construction, illustratively shown in Fig. 3, and consists of a tank 10, an impeller 11 therein having a vertical shaft 12 about which agitating air is admitted through tube 13 to cause flotation reagent in the tank, with or without auxiliary foaming agent and with or without modifying agent to form the froth, which together with the extracted material is skimmed off from the top into the collector trough 14 at one side of the tank.

According to the invention, the first stage of flotation in the battery A or cells is conducted with a pulp of moderate solid content and it yields a moderately rich froth entraining much of the valuable component to be extracted.

The tailings from the first stage is then discharged therefrom through a conduit 15 to be subjected to suitable thickening for discharge of the thickened pulp to the second stage B and of the clear supernatant liquor to the third stage C. By virtue of the relatively high solid content of the pulp in the second stage, the relatively small residue of valuable component remaining therein after flotation in the first stage will be substantially completely recovered and the substantially completely exhausted tailings will be passed off through conduit 16 from the second stage.

The layer of froth 17 from the second stage is delivered by conduit 18 back to the first stage A for recycling therethrough. The froth collecting at 19 in the first stage is delivered through conduit 20 to the third stage C. Since the pulp in said third stage has quite low solid content, a rich and stable froth 21 is yielded, which is passed off through conduit 22 for recovery of the valuable ore component therefrom.

Preferably both the pulp of high solid content in the second stage B and that of low solid content in the third stage C are derived from the first stage A after the extraction operation therein. This may be performed by the use of a single decantation or separating tank 23 from which all the solid particles which settle as a pulp to the bottom are conveyed by conduit 24 to the second stage B, while the clear mother liquor constituting the supernatant fraction is passed by way of conduit 26 to the third stage C. Stage C may be designated the re-cleaning stage, the supernatant clear liquor from the gravity separator 23 affording a dilute pulp when conveyed to stage C, with low proportion of solid to liquid and hence a rich froth. Preferably also the tailings from said third stage are returned by conduit 27 back to the settling tank 23 for gravity separation in admixture with the tailings from the first stage.

Thus by the operation set forth, a fair degree of extraction occurs in the first stage A, substantially complete extraction occurs in the second stage B and a heavy relatively stable froth in the third stage C is the agency for the removal from the pulp of the valuable ore component to be extracted.

Preferably the ore from the grinding mill is pretreated before delivery into the flotation cells. To this end the mother liquor with the ground ore forming a slurry is delivered into the tank 28 which has a conical bottom 29. The supernatant muddy water is drawn off as in the collecting trough 30 for clarification, while the heavier residue is passed through pipe 31 for further decantation and washing, as shown.

In a desirable embodiment, clear mother liquor or brine is preferably passed through conduit 32 to that level of tank 33 (preferably with an inclined bottom 34) to which the liquor reaches, thereby to rinse the mass. The rinse water with the debris passes off through gutter 35 and is urged by pump 36 by way of conduit 37 back to the tank 28. The cleansed residual slurry may then be conveyed, as for instance by a reciprocating dredge or rack 38 to conduit 39 for admission to the first flotation stage A above described.

While the above system and mode of operation has been described in general terms and is applicable for the treatment of ores of a wide variety, it finds a particular application, as above noted, in the extraction of potassium chloride from sylvinite ore. In this application it will be understood that the mother liquor would be a concentrated solution or brine of the water soluble components of sylvinite ore, largely of potassium chloride and sodium chloride. The flotation reagent or collecting agent would be any of a variety of known compounds selective for potassium chloride such as amine acetates of the formula $RNH_2HO_2CCH_3$ in which R is a hydrocarbon radical having preferably between 16 and 18 atoms of carbon, or sodium salts of alkyl sulphates of the formula $RSO_4Na$ in which R is a hydrocarbon radical having between 6 and 12 atoms of carbon. The flotation reagent is preferably mixed with a frothing agent such as oil of pine to ensure a sufficiently stable froth.

Even though pretreatment as above described, is resorted to prior to flotation of sylvinite ore, it will be understood that substantial quantities of schist including calcium sulphate and clay, would enter the flotation cells and such schist would adsorb or absorb and waste a great proportion of the costly flotation reagent. A modifying agent of suitable character is therefore introduced into each of the cells which will render the froth substantially inert to such dross or refuse components. The modifying agent may be any of a wide variety of materials including albuminoids, bone glue, urea and starch, the latter being preferable for the treatment of Alsatian sylvinite ore.

For treatment of such sylvinite ore, a desirable treating solution per ton of unrefined slurry to be treated would be approximately as follows:

As the flotation reagent—120 grams of sodium salts of alkyl sulphonates or sulphates or alkyl or alcohol acetamides of the formulas above specified.
As the frothing agent—80 grams of oil of pine.
As the modifying agent—100 grams of starch.

In practice, if the mother liquor is saturated with salt, say at 25° C., even a moderate drop of temperature overnight, say to 22° C., would cause excess salt to crystallize in the form of very minute crystals which would present a very large surface area, thus leading to the absorption or adsorption of much of the flotation reagent with corresponding waste. To avoid such waste, the temperature of the mother liquor in the flotation cells is kept from dropping to such extent as to permit such minute crystals to form. It is of course not necessary to maintain an accurate thermostatic control, but occasional reheating of the liquor would be adequate should the liquor in the cells become cool.

As many changes could be made in the above method and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention what we claim as new and desire to secure by Letters Patent of the United States is:

1. The method of separation by flotation of potassium chloride from sodium chloride with a collecting agent selective for potassium chloride, which comprises a first stage of flotation including the step of floating, removing a froth concentrate, separating the tailings to remove therefrom a fraction of relatively high solid content leaving a liquor fraction, passing said froth concentrate from the first stage of flotation to said liquor fraction to provide a combined froth concentrate and liquor fraction and performing another stage of froth flotation upon said combined froth concentrate and liquor fraction.

2. The method of separation by flotation of potassium chloride from sodium chloride with a collecting agent selective for potassium chloride, which comprises performing a first stage of flotation, including the steps of floating, removing a froth concentrate, separating the tailings from said first stage into a fraction of relatively high solid content and a substantially clear mother liquor, passing off the high solid content fraction and performing a second stage of froth flotation thereon, and passing the froth removed from said first stage to the substantially clear mother liquor segregated from said first stage and performing a third stage of froth flotation on said combined froth concentrate and liquor fraction.

3. The method recited in claim 2 in which the froth from the second stage is re-cycled through the first stage.

4. The method of separation by flotation of potassium chloride from sodium chloride with a collecting agent selective for potassium chloride in three stages, which comprises a first stage of flotation with pulp of medium solid content, including the steps of floating, removing a froth concentrate, removing the tailings from the first stage and gravity separating said tailings into a fraction of relatively high solid content and a substantially clear mother liquor, passing off the high solid content fraction and performing a second stage of froth flotation thereon, and passing the froth removed from the first stage of flotation to the substantially clear mother liquor separated from said first stage and performing a third stage of froth flotation on said combined froth and liquor fraction.

5. The method of separation by flotation of potassium chloride from sodium chloride with a collecting agent selective for potassium chloride in three stages, which comprises a first stage of flotation with pulp of medium solid content, including the steps of floating, removing a froth concentrate, removing the tailings from said first stage and separating the same into two fractions, comprising a thickened fraction of relatively high solid content and a substantially clear supernatant mother liquor, passing off the high solid content fraction and performing a second stage of froth flotation thereon and passing the froth concentrate removed from the first stage to the substantially clear mother liquor separated from said first stage, and performing a third stage of froth flotation thereon, removing the tailings from the third stage and combining them with those from the first stage for gravity separation and recycling thereof.

6. The method recited in claim 5 in which the froth from the second stage is re-cycled through the first stage.

7. The combination recited in claim 5 in which the mother liquor of the pulp is a saturated solution of salts in the ore and is heated a few degrees to a temperature to dissolve the minute crystals of such salts.

8. The method of separation of a high grade concentrated product of potassium chloride from mud containing ground ore of particle size of one millimeter or less in diameter with substantial components of sodium chloride and potassium chloride, which method comprises settling the slurry of ground ore to produce a supernatant layer of muddy water, decanting the muddy water, rinsing the settled ore particles with brine and subjecting the thus rinsed product to froth flotation in appropriate reagent for recovery of such high grade of concentrated product of potassium chloride, said flotation being conducted in three stages comprising a first stage with pulp of medium solid content, a second stage with pulp of relatively high solid content, and a third stage with pulp of relatively low solid content and after flotation in the first stage, subjecting the tailings from the first and third stages to thickening and feeding the thickened tailings to the second stage and the clear mother liquor to the third stage.

9. The combination recited in claim 8 in which the mineral carrying froth is re-cycled from the second to the first stage.

J. COLIN.
R. BURR.
R. FRIEDRICH.
X. HERRGOTT.

(References on following page)

REFERENCES CITED

The following references are of record in the file of this patent:

UNITED STATES PATENTS

| Number | Name | Date |
|---|---|---|
| 1,881,875 | Newton | Oct. 11, 1932 |
| 2,164,063 | Handy | June 27, 1934 |
| 2,014,405 | Weed | Sept. 17, 1935 |
| 2,064,031 | Ralston | Dec. 15, 1936 |
| 2,188,932 | Weinig | Feb. 6, 1940 |
| 2,211,396 | Weinig | Aug. 13, 1940 |
| 2,288,497 | Tartaron | June 30, 1942 |
| 2,297,664 | Tartaron | Sept. 29, 1942 |
| 2,317,413 | Shelton | Apr. 27, 1943 |
| 2,322,789 | Cole | June 29, 1943 |
| 2,330,158 | Tartaron | Sept. 21, 1943 |
| 2,336,854 | Ferris | Dec. 14, 1943 |
| 2,340,523 | Ferris | Feb. 1, 1944 |
| 2,364,520 | Cole | Dec. 5, 1944 |
| 2,365,805 | Cole | Dec. 26, 1944 |
| 2,419,497 | Meyer | Apr. 22, 1947 |
| 2,420,476 | Greene | May 13, 1947 |

OTHER REFERENCES

American Institute of Mining and Metallurgical Engineers, contribution No. 86, by John T. Crawford (c) 1935 11 pages.

Taggart, Handbook of Mineral Dressing, 1945, section 2, pgs. 44–45.

Taggart, Handbook of Mineral Dressing, 1945, section 12, page 98.